United States Patent
Turner et al.

(10) Patent No.: US 7,026,027 B2
(45) Date of Patent: *Apr. 11, 2006

(54) AMORPHOUS COPOLYESTERS

(75) Inventors: Sam Richard Turner, Kingsport, TN (US); Jonathan Terrill Milburn, Kingsport, TN (US); Robert William Seymour, Kingsport, TN (US); Kab Sik Seo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/808,070

(22) Filed: Mar. 24, 2004

(65) Prior Publication Data

US 2005/0070686 A1 Mar. 31, 2005

Related U.S. Application Data

(63) Continuation-in-part of application No. 10/195,267, filed on Jul. 15, 2002, now abandoned.

(60) Provisional application No. 60/306,221, filed on Jul. 18, 2001.

(51) Int. Cl.
*B29D 22/00* (2006.01)
*C08G 63/16* (2006.01)

(52) U.S. Cl. .................. 428/35.7; 528/302; 528/307; 528/308; 528/308.6; 264/176.1

(58) Field of Classification Search ............ 528/302, 528/308, 308.6, 307; 428/35.7; 264/176.1
See application file for complete search history.

(56) References Cited

U.S. PATENT DOCUMENTS 2,901,466 A 8/1959 Kibler et al.

(Continued)

FOREIGN PATENT DOCUMENTS

EP 411136 A1 2/1991

(Continued)

OTHER PUBLICATIONS

R. E. Wilfong, *Journal of Polymer Science*, 54, 385 (1961).

(Continued)

*Primary Examiner*—Samuel A. Acquah
(74) *Attorney, Agent, or Firm*—Bernard J. Graves, Jr.; Eric D. Middlemas

(57) ABSTRACT

Disclosed are amorphous copolyesters having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 comprising (1) a diacid component comprising about 90 to 100 mole percent terephthalic acid residues and 0 to about 10 mole percent isophthalic acid residues; and (2) a diol component comprising about 10 to 70 mole percent 1,4-cyclohexanedimethanol residues and about 90 to 30 mole percent neopentyl glycol residues; wherein the amorphous copolyesters comprises 100 mole percent diacid component and 100 mole percent diol component. The amorphous copolyesters are useful in the manufacture or fabrication of medical devices which have improved resistance to degradation upon exposure to lipids, as a profile produced by profile extrusion and as an injection molded article. Also, a method of melt processing the amorphous copolyester is disclosed which allows for performing a minimal drying or no drying of the copolyester prior to melt processing.

35 Claims, 2 Drawing Sheets

U.S. PATENT DOCUMENTS

| | | |
|---|---|---|
| 3,592,875 A | 7/1971 | Brinkmann et al. |
| 3,592,876 A | 7/1971 | Brinkmann et al. |
| 4,025,492 A | 5/1977 | Binsack et al. |
| 4,064,112 A | 12/1977 | Rothe et al. |
| 4,093,603 A | 6/1978 | Jackson, Jr. et al. |
| 4,136,089 A | 1/1979 | Bier et al. |
| 4,161,579 A | 7/1979 | Edelman et al. |
| 4,176,224 A | 11/1979 | Bier et al. |
| 4,182,841 A | 1/1980 | Hauenstein |
| 4,208,527 A | 6/1980 | Horlbeck et al. |
| 4,219,527 A | 8/1980 | Edelman et al. |
| 4,234,708 A | 11/1980 | Edelman et al. |
| 4,238,593 A | 12/1980 | Duh |
| 4,398,022 A | 8/1983 | Sublett |
| 4,471,108 A | 9/1984 | Belder et al. |
| 4,520,188 A | 5/1985 | Holzrichter et al. |
| 4,551,403 A | 11/1985 | Miyakawa et al. |
| 4,983,711 A | 1/1991 | Sublett et al. |
| 5,145,742 A | 9/1992 | Yau |
| 5,235,027 A | 8/1993 | Thiele et al. |
| 5,376,735 A | 12/1994 | Sublett |
| 5,442,036 A | 8/1995 | Beavers et al. |
| 5,523,382 A | 6/1996 | Beavers et al. |
| 5,656,715 A | 8/1997 | Dickerson et al. |
| 5,681,918 A | 10/1997 | Adams et al. |
| 5,849,846 A | 12/1998 | Cheng et al. |
| 6,183,848 B1 | 2/2001 | Connell et al. |
| 6,380,279 B1 | 4/2002 | Moens et al. |

FOREIGN PATENT DOCUMENTS

| | | |
|---|---|---|
| EP | 781565 | 7/1997 |
| JP | 3225982 BS | 11/2001 |

OTHER PUBLICATIONS

F. W. Billmeyer, *Textbook of Polymer Science*, John Wiley & Sons, (1971), p. 84.

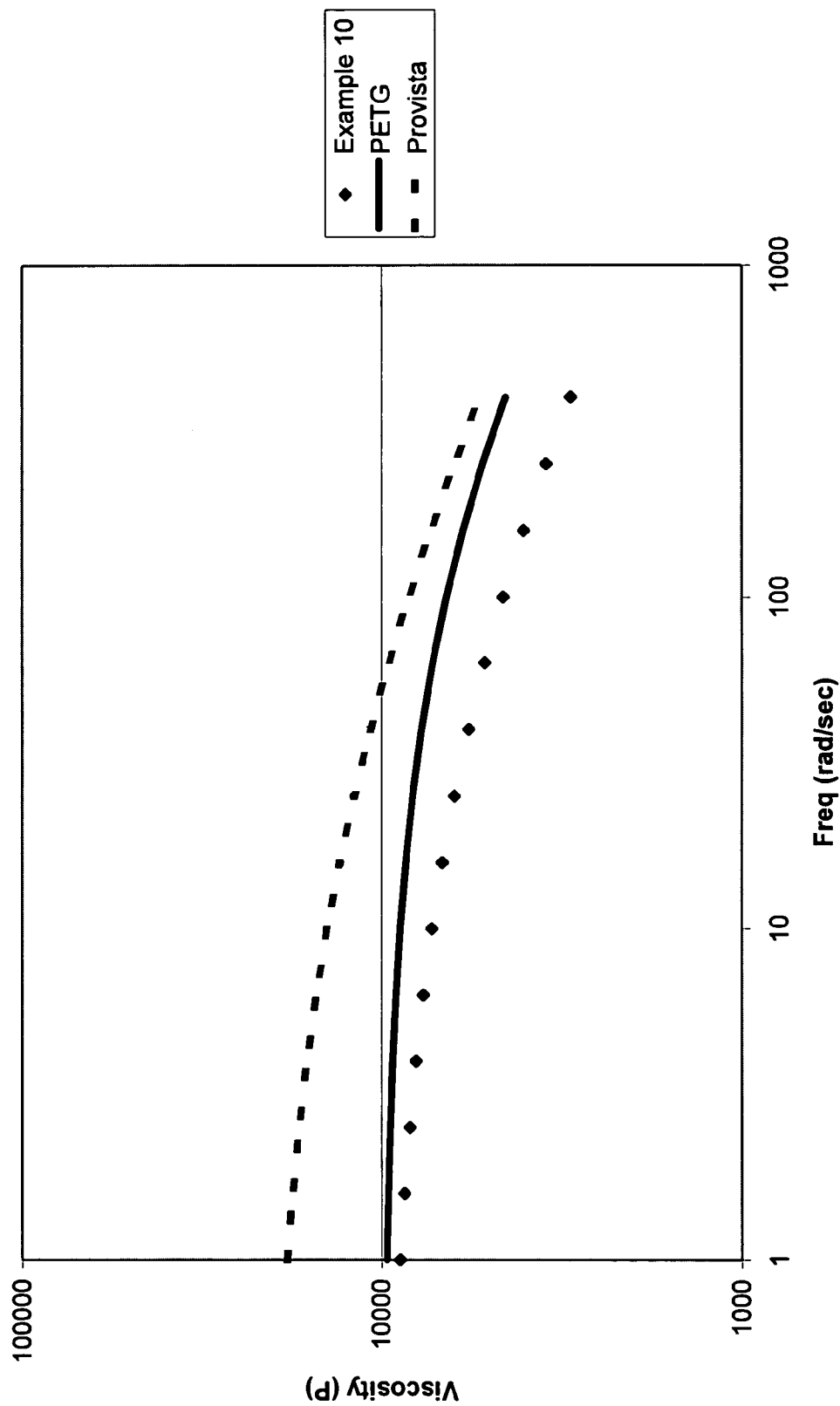

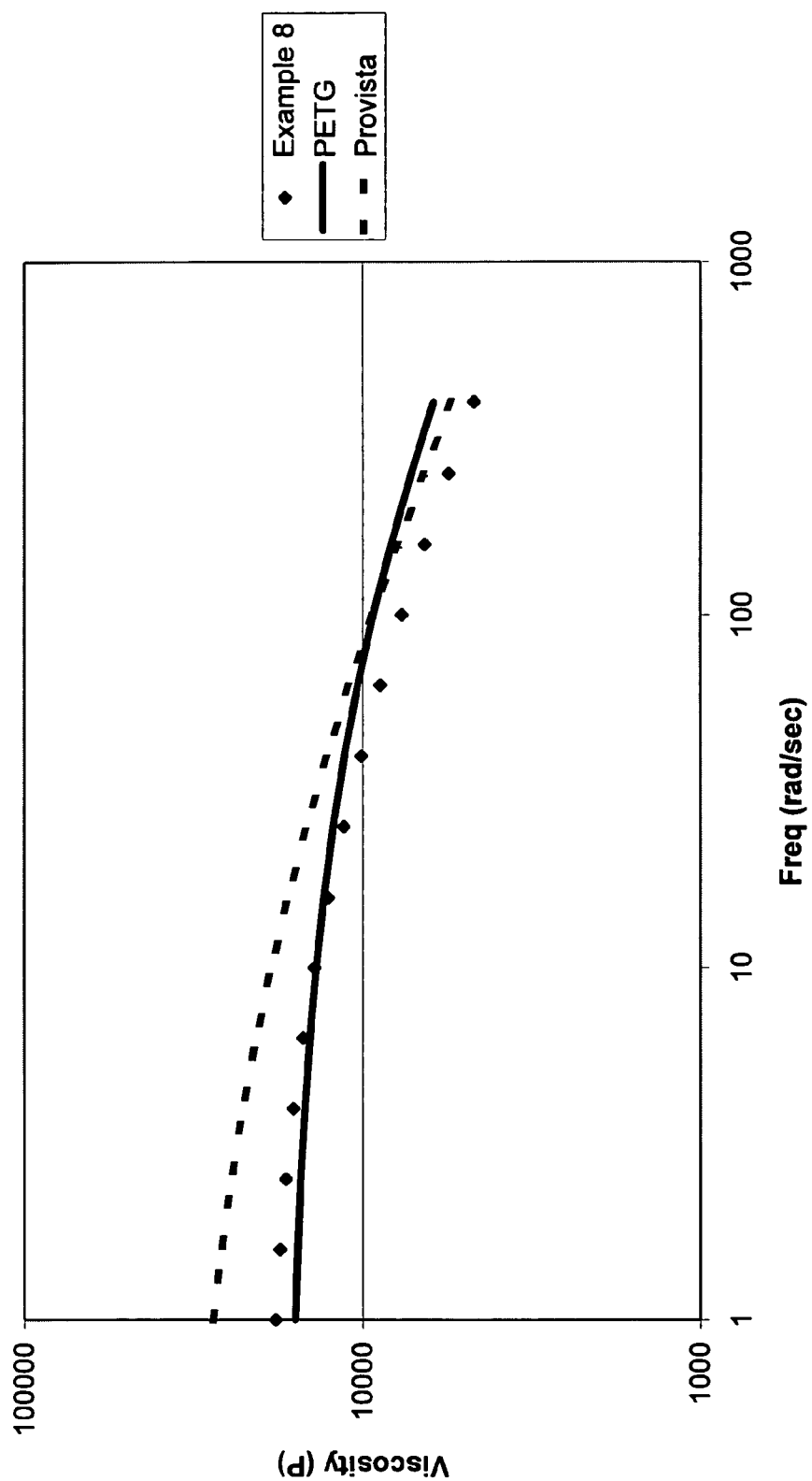

AMORPHOUS COPOLYESTERS

CROSS REFERENCE TO RELATED APPLICATION

This application is a continuation-in-part of application Ser. No. 10/195,267 filed Jul. 15, 2002 now abandoned, which claims the benefit of U.S. Provisional Application Ser. No. 60/306,221 filed Jul. 18, 2001.

TECHNICAL FIELD OF THE INVENTION

This invention relates to amorphous copolyesters derived from 1,4-cyclohexanedimethanol and neopentyl glycol. More particularly, this invention relates to such copolyesters that have a combination of unique properties and to shaped articles fabricated therefrom such as profile extrusions and medical equipment.

BACKGROUND OF THE INVENTION

Amorphous copolyesters comprising terephthalic acid (T) residues and diol residues comprising varying ratios of 1,4-cyclohexanedimethanol (CHDM) residues and ethylene glycol (EG) residues are well known in the plastics marketplace. As used herein, the abbreviation PETG refers to copolyesters comprising terephthalic acid residues as the diacid residue component and a diol residue component comprising up to 50 mole percent CHDM residues with the remainder EG residues. PCTG refers to copolyesters comprising T residues and a diol residue component comprising greater than 50 mole percent CHDM residues with the remainder being EG residues. Copolyesters comprising T residues and diol residues comprising about 20 to 70 mole percent CHDM residues and about 80 to 30 mole percent EG residues are amorphous. The term "amorphous" as defined herein means a polyester that does not exhibit a substantial crystalline melting point when scanned by differential scanning calorimetry (DSC) at a rate of 20° C./minute.

Amorphous copolyesters in general possess a combination of desirable properties for many applications. These properties include excellent clarity and color, toughness, ease of processing, and chemical resistance. Accordingly, amorphous copolyesters are known to be useful for the manufacture of extruded sheet, packaging materials, and parts for medical devices, etc. Application in transparent medical parts requires resistance to craze formation and mechanical failure when exposed to lipid and/or isopropyl alcohol (IPA) solutions. Whereas amorphous copolyesters are known in the art to have good resistance to these chemicals and are widely applied in these applications, craze formation occurs at high strains and is thus an area of needed improvement. Consequently, there is an unmet need for amorphous copolyesters that under high strains have improved resistance to lipid and IPA solutions.

There is also an important need for amorphous copolyesters that have improved resistance to hydrolytic degradation. U.S. Pat. No. 5,656,715 discloses that copolyesters containing a diol residue component comprising 60 to 100 mole percent residues of 1,4-cyclohexanedimethanol exhibit improved resistance to hydrolytic degradation.

Neopentyl glycol (NPG-2,2-dimethylpropane-1,3-diol) has been used in combination with EG and terephthalic acid to form amorphous copolyesters. However, the combination of NPG and CHDM as the diol component of copolyesters has received minimal attention. Several early references disclose copolyesters comprising both CHDM and NPG residues and terephthalic acid residues. Example 46 of U.S. Pat. No. 2,901,466 describes a copolyester of unknown composition that was reported to have a crystalline melting point of 289–297° C. U.S. Pat. No. 3,592,875 discloses copolyester compositions that contain both NPG and CHDM residues with an added polyol present for branching. U.S. Pat. No. 3,592,876 discloses polyester compositions that contain EG, CHDM and NPG residues with the NPG residue level limited to up to 10 mole percent. U.S. Pat. No. 4,471,108 discloses low molecular weight polyesters some of which contain CHDM and NPG residues, but also contain a multifunctional branching agent. U.S. Pat. No. 4,520,188 describes low molecular weight copolyesters comprising mixtures of aliphatic and aromatic acid residues with both NPG and CHDM residues present. Japanese Patent Publication JP 3225982 B2 discloses amorphous copolyesters which are said to be useful in the formulation of coating compositions for steel sheet. The disclosed copolyesters comprise a diacid component comprising mixtures of aliphatic and aromatic acid residues and a diol component comprising NPG and CHDM residues.

U.S. Pat. No. 4,551,403 discloses low molecular weight polyesters that are used as binders or as the matrix resin for photosensitive materials for electrophotography. Example 1 of this patent discloses the preparation of a polymer from dimethyl terephthalate, neopentyl glycol and 1,4-cyclohexanedimethanol. The polymer is said to have a reduced viscosity of 0.35 as measured at 30° C. in tetrachloroethane at a polymer concentration of 0.5%. The reduced viscosity of 0.35 corresponds to an inherent viscosity as defined herein of 0.29 dL/g using equations provided by F. W. Billmeyer, *Textbook of Polymer Science*, John Wiley & Sons, (1971) page 84. The low molecular weight polyesters disclosed by U.S. Pat. No. 4,551,403 are not useful for producing shaped articles by injection molding or extrusion procedures.

EP-A1-411,136 discloses copolyesters comprising diacid residues comprising mainly of terephthalic acid residues and glycol residues comprising 15 to 85 mole percent C-2 to C-16 aliphatic diol residues and 85 to 15 mole percent 1,4-cyclohexanedimethanol residues wherein 80 mole percent of the cyclohexanedimethnol residues are in the trans form. It is believed that the properties of the copolyesters specifically exemplified in EP-A1-411,136 are inferior to the copolyesters described herein. More specifically, the copolyesters described herein possess improved melt strength and resistance to hydrolysis as compared to the copolyesters of the examples of EP-A1-411,136.

SUMMARY OF THE INVENTION

We have discovered that amorphous polyesters derived from terephthalic acid, CHDM and NPG are valuable compositions useful for the manufacture of medical devices that exhibit improved resistance to degradation upon exposure to lipids. The amorphous copolyesters provided by the present invention have an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 and comprise:

(1) a diacid component comprising about 90 to 100 mole percent terephthalic acid residues and 0 to about 10 mole percent isophthalic acid residues; and (2) a diol component comprising about 10 to about 70 mole percent 1,4-cyclohexanedimethanol residues and about 90 to about 30 mole percent neopentyl glycol residues;

wherein the amorphous copolyesters comprises 100 mole percent diacid component and 100 mole percent diol component.

Another embodiment of the present invention concerns a shaped article such as an extruded profile or an extruded or injection molded medical device having improved resistance to degradation from exposure to lipids wherein the medical device is fabricated or prepared from an amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
(1) a diacid component comprising about 90 to 100 mole percent terephthalic acid residues and 0 to about 10 mole percent isophthalic acid residues; and
(2) a diol component comprising about 10 to about 70 mole percent 1,4-cyclohexanedimethanol residues and about 90 to about 30 mole percent neopentyl glycol residues;

wherein the amorphous copolyesters comprises 100 mole percent diacid component and 100 mole percent diol component.

In still another embodiment of the present invention, a method of melt processing an amorphous copolyester having a moisture content prior to melt processing of 0.02 weight % or more comprises the steps of:
(a) prior to melt processing, performing a minimal drying or no drying of the copolyester such that the copolyester has a moisture content of 0.02 weight % or more prior to melt processing, and
(b) melt processing the copolyester, wherein the copolyester has an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 and comprises:
(1) a diacid component consisting essentially of about 90 to 100 mole percent terephthalic acid residues and 0 to about 10 mole percent isophthalic acid residues; and
(2) a diol component consisting essentially of about 10 to about 70 mole percent 1,4-cyclohexanedimethanol residues and about 90 to about 30 mole percent neopentyl glycol residues, wherein the copolyester is based on 100 mole percent diacid component and 100 mole percent diol component.

BRIEF DESCRIPTION OF THE DRAWINGS

FIG. 1 shows the melt viscosity shear rate curve at 260° C. for PETG, PROVISTA™, and the amorphous copolyester of the present invention described in Example 10. FIG. 2 shows the melt viscosity shear rate curve at 260° C. for PETG, PROVISTA™, and the amorphous copolyester of the present invention described in Example 8.

DETAILED DESCRIPTION OF THE INVENTION

Copolyesters comprising about 90 to 100 mole percent terephthalic acid (T) residues, 0 to about 10 mole percent isophthalic acid residues, 1,4-cyclohexanedimethanol (CHDM) residues, and neopentyl glycol (NPG) residues are amorphous in the approximate composition ranges of about 10 to about 70 mole % CHDM and about 90 to about 30 mole percent NPG. These unique amorphous copolyesters show surprisingly improved resistance to crazing when exposed to lipids or IPA. In addition, the combination of CHDM and NPG as comonomer diols in the copolyesters of the present invention, results in copolyester backbones that exhibit enhanced stability to hydrolysis for the amorphous composition range. The present copolyesters having sufficient molecular weight to be molding or extrusion grade plastics and based solely on CHDM and NPG as diols, are not known. In addition, it is unexpected that the addition of NPG to a copolyester would improve resistance to lipids and IPA.

The amorphous copolyesters of the present invention may be prepared by conventional polymerization processes known in the art, such as the procedures disclosed in U.S. Pat. Nos. 4,093,603 and 5,681,918. Examples of polycondensation processes useful in the present invention include melt phase processes conducted with the introduction of an inert gas stream, such as nitrogen, to shift the equilibrium and advance to high molecular weight or the more conventional vacuum melt phase polycondensations, at temperatures in the range of from about 240 to 300° C. or higher which are practiced commercially. The terephthalic and isophthalic acid residues of the copolyesters may be derived from either the dicarboxylic acids or ester-producing equivalents thereof such as esters, e.g., dimethyl terephthalate and dimethyl isophthalate, or acid halides, e.g. acid chlorides. Although not required, conventional additives may be added to the copolyesters of the invention in typical amounts. Examples of such additives include pigments, colorants, stabilizers, antioxidants, extrusion aids, slip agents, carbon black, flame retardants and mixtures thereof.

The polymerization reaction may be carried out in the presence of one or more conventional polymerization catalysts. Typical catalysts or catalyst systems for polyester condensation are well-known in the art. Suitable catalysts are disclosed, for example, in U.S. Pat. Nos. 4,025,492, 4,136,089, 4,176,224, 4,238,593, and 4,208,527, the disclosures of which are herein incorporated by reference. Further, R. E. Wilfong, Journal of Polymer Science, 54, 385 (1961) describes typical catalysts, which are useful in polyester condensation reactions. Preferred catalyst systems include Ti, Ti/P, Mn/Ti/Co/P, Mn/Ti/P, Zn/Ti/Co/P, Zn/Al. When cobalt is not used in the polycondensation, copolymerizable toners may be incorporated into the copolyesters to control the color of these amorphous copolyesters so that they are suitable for the intended applications where color may be an important property. In addition to the catalysts and toners, other additives, such as antioxidants, dyes, etc. may be used in the copolyesterifications.

The copolyesters of the invention have an inherent viscosity (IV) of at least about 0.5 dL/g, preferably about 0.5 to 1.1 dL/g, measured at a temperature of 25° C. at 0.5 g/dL concentration in a solvent mixture of symmetric tetrachloroethane and phenol having a weight ratio of symmetric tetrachloroethane to phenol of 2:3. In one embodiment of the invention, the diacid component of the amorphous copolyester consists essentially of about 90 to 100 mole percent terephthalic acid residues and 0 to about 10 mole percent isophthalic acid residues; and the diol component consists essentially of about 10 to about 70 mole percent 1,4-cyclohexanedimethanol residues and about 90 to about 30 mole percent neopentyl glycol residues. Preferably, the diacid component consists essentially of at least 95 mole percent and more preferably 100 mole percent terephthalic acid. The diol component preferably consists essentially of residues of about 30 to about 70 mole percent or, more preferably, about 35 to about 60 mole percent, CHDM residues and about 70 to about 30 mole percent or, more preferably, about 40 to about 65 mole percent, NPG residues. The most preferred copolyesters have an IV of about 0.60 to about 1.1 dL/g and comprise:

(1) a diacid component consisting essentially of terephthalic acid residues; and
(2) a diol component consisting essentially of about 35 to about 60 mole percent 1,4-cyclohexanedimethanol residues and about 40 to about 65 mole percent neopentyl glycol residues;

wherein the amorphous copolyesters comprises 100 mole percent diacid component and 100 mole percent diol component.

The copolyesters of the invention can be molded and extruded using conventional melt processing techniques to produce the shaped article of our invention. The copolyesters are particularly useful in the manufacture of small and intricately shaped articles such as tubing used for handling and transporting medical fluids, etc. The lipid resistance of the copolyesters of our invention under external strain renders the copolyesters particularly useful in the manufacture of shaped articles including medical devices such as tubes, pump housings, connectors, etc. where lipid resistance is important. Such medical devices may be transparent. The shaped articles manufactured from the copolyesters of this invention possess improved resistance to degradation by medical lipid solutions such as Liposyn II 20% intravenous fat emulsion. The improved resistance to degradation is manifested by retention of elongation to break values (retention of toughness) and significant reduction of visual crazing in molded test bars as shown in the examples below.

The shaped articles may be produced according to conventional thermoplastic processing procedures such as injection molding, calendaring, extrusion, blow molding, extrusion blow molding, and rotational molding. The amorphous copolyesters of the present invention derived from CHDM and NPG exhibit improved hydrolytic stability at various melt temperatures. In the conversion of the copolyesters into shaped articles, the moisture content of the copolyester typically is reduced to less than about 0.02% prior to melt processing.

Preferably, prior to melt processing, the minimal drying is performed by conventional methods for less than 2 hours at 60 to 100° C. For the minimal drying, a desiccant bed with forced dehumidified air at 60° C. to 100° C. is preferred. Even more preferably, there is no drying of the copolyester prior to melt processing.

The melt viscosity versus shear rate relationship in polymers is a very important property of polymeric materials. One useful melt viscosity/shear rate relationship is shear thinning. Shear thinning occurs when the melt flow is non-Newtonian and shows a reversible decrease in viscosity with increasing shear rate. Shear thinning characteristics are very important for allowing the processing of injection molded and extruded parts and sheets, such as profiles. Profile extrusion is an extrusion process where special dies are used to produce articles of asymmetrical shapes. House siding, plastic tubes, channels, baseboard moldings, etc. are examples of profile extruded parts and are referred to as profiles. Generally amorphous polymers are used in profile extrusion to avoid the shrinking that takes place during crystallization processes. The asymmetric nature of the products from this process requires special resin properties such as high melt strength at low melt viscosities and shear thinning melt rheology. The amorphous copolyesters of the present invention exhibit improved shear thinning behavior.

Referring to the accompanying Figures, FIG. 1 shows melt viscosity shear rate curves at 260° C. for several polymers: (1) PETG is a copolyester comprises a diacid component comprising 100 mole percent terephthalic acid residues and a diol component comprising 69 mole percent ethylene glycol residues and 31 mole percent CHDM residues and is commercially available as EASTAR® 6763 Copolyester from Eastman Chemical Company; (2) PROVISTA™ copolyester (also available from Eastman Chemical Company), which is specifically designed to shear thin by adding branching agents, has a composition similar to PETG; and (3) the copolyester of Example 10 of the present invention. Surprisingly, Example 10 exhibits a shear thinning behavior that resembles the PROVISTA™ copolyester and not the PETG. Similarly, FIG. 2 shows melt viscosity shear rate curves at 260° C. for the copolyester of Example 8 which shear thins like PROVISTA™ copolyester and not PETG copolyester. For the curves constituting FIGS. 1 and 2, the complex viscosity was determined by a Rheonmetrics Dynamic Analyzer (RDA II) with 25 mm diameter parallel plates, 1 mm gap and 10% strain at 260° C. The samples were dried at 60° C. for 24 hours in a vacuum oven before the frequency sweep test.

Thus, based on the shear thinning properties described in FIGS. 1 and 2, another embodiment of the present invention is a profile produced by profile extrusion comprising an amorphous copolyester composition having an inherent viscosity of at least 0.5 dL/g and comprising:

(1) a diacid component consisting essentially of about 90 to 100 mole percent terephthalic acid residues and 0 to about 10 mole percent isophthalic acid residues; and
(2) a diol component consisting essentially of about 10 to about 70 mole percent 1,4-cyclohexanedimethanol residues and about 90 to about 30 mole percent neopentyl glycol residues;

wherein the amorphous copolyesters comprises 100 mole percent diacid component and 100 mole percent diol component.

Further, another embodiment is an injection molded article comprising an amorphous copolyester consisting essentially of an acid component of residues of at least 90 mole percent terephthalic acid and a glycol component of residues of about 10 to about 70 mole percent 1,4-cyclohexanedimethanol and about 90 to about 30 mole percent neopentyl glycol, based on 100 mole percent acid component and 100 mole percent glycol component.

The copolyesters of the invention also may be used to manufacture shaped articles by extrusion blow molding processes. Such processes typically comprise the steps of (1) extruding a copolyester through a die to form a tube of molten copolyester; (2) positioning a mold having the desired finished shape around the tube of molten copolyester; and (3) introducing a gas into the tube of molten copolyester, causing the extrudate to stretch and expand to fill the mold.

EXAMPLES

The following Examples are intended to illustrate, but not limit, the scope of the present invention. The inherent viscosities were measured at a temperature of 25° C. at 0.5 g/dL concentration in a solvent mixture of symmetric tetrachloroethane and phenol having a weight ratio of symmetric tetrachloroethane to phenol of 2:3. The $2^{nd}$ cycle glass transition temperatures were determined according to DSC at a heating rate of 20° C./min to a temperature of 280–300°

C., quenching in liquid nitrogen to 0° C., and then rerunning the sample and recording the Tg as the $2^{nd}$ cycle glass transition temperature. Final copolyester compositions were determined by proton NMR analysis on a 600 MHz JEOL instrument.

Example 1

A copolyester comprising a diacid component consisting of 100 mole percent terephthalic acid residues and a diol component consisting of 66 mole percent CHDM residues and 34 mole percent NPG residues (hereinafter referenced as 100T/85CHDM/15NPG) was prepared. Dimethyl terephthalate (DMT; 77.6 g, 0.4 mole), NPG (28.91 g, 0.28 moles), CHDM (46.37 g, 0.32 moles), and 1.49 ml of a solution containing 15 g of titanium tetraisopropoxide in 250 ml of n-butanol were added to a 500 ml single-neck, round-bottom flask. The flask was immersed in a Belmont metal bath that was pre-heated to 200° C. Immediately after the flask was immersed the temperature set point was increased to 220° C., and held for 1 hour. After the hour at 220° C. the temperature was increased to 260° C., and held for 30 minutes. After this time the theoretical amount of methanol was collected. The pressure in the flask then was reduced from atmospheric to 0.5 Torr. When the pressure had been reduced to 0.5 Torr the temperature set point was raised to 280° C. Stirring was reduced as the viscosity increased until a stir rate of 15 revolutions per minute (RPM) was obtained. The vacuum was discontinued and nitrogen was bled into the flask. The polymer was allowed to solidify by cooling to a temperature below Tg, removed from the flask and ground to pass through a 3 mm screen. The inherent viscosity of the polymer was 0.895 dL/g. The polymer had a $2^{nd}$ cycle Tg of 87.82° C. Compositional analysis (by NMR) showed the diol component of the copolyester consisted of 66.1 mole percent CHDM residues and 33.9 mole percent NPG residues.

Example 2

A copolyester having the composition 100T/61CHDM/39NPG was prepared. DMT (77.60 g, 0.40 moles), NPG 33.70 grams (0.33 moles) of NPG, 39.74 grams (0.28 moles) of CHDM, and 1.49 ml of a solution containing 15 grams of titanium tetraisopropoxide in 250 ml of n-butanol were added to a 500 ml single neck round bottom flask and reacted and polymerized according to the procedure described in Example 1. The inherent viscosity of the polymer was 0.930 dL/g. The polymer had a $2^{nd}$ cycle Tg of 86.70° C. with no crystalline melting point observed, and compositional analysis showed that the diol component of the copolyester consisted of 61.4 mole percent CHDM residues and 38.6 mole percent NPG residues.

Example 3

A copolyester having the composition 100T/56CHDM/44NPG was prepared. DMT (77.6 g, 0.40 moles), NPG (38.48 g, 0.37 moles), CHDM (33.12 g, 0.23 moles), and 1.47 ml of a solution containing 15 g of titanium tetraisopropoxide in 250 ml of n-butanol were added to a 500 ml, single-neck, round-bottom flask and reacted and polymerized according to the procedure described in Example 1. The inherent viscosity of the polymer was 0.938 dL/g. The polymer had a $2^{nd}$ cycle Tg of 85.90° C. with no crystalline melting point observed, and compositional analysis showed that the diol component of the copolyester consisted of 55.8 mole percent CHDM and 44.2 mole percent NPG residues.

Example 4

A copolyester having the composition 100T/45CHDM/55NPG was prepared. DMT (77.60 g, 0.4 moles), NPG (43.26 g, 0.42 moles), CHDM (26.50 g, 0.18 moles), and 1.44 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 0.897 dL/g. The polymer had a $2^{nd}$ cycle Tg of 83.66° C. with no crystalline melting point observed, and compositional analysis showed the diol component of the copolyester consisted of 44.7 mole percent CHDM and 55.3 mole percent NPG residues.

Example 5

A copolyester having the composition 100T/32CHDM/68NPG was prepared. DMT (77.60 g, 0.4 moles), NPG (48.05 g, 0.46 moles), CHDM (19.87 g, 0.14 moles), and 1.42 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 1.143 dL/g. The polymer had a $2^{nd}$ cycle Tg of 82.43° C. with no crystalline melting point observed, and compositional analysis showed the diol component of the copolyester consisted of 32.3 mole percent CHDM and 67.7 mole percent NPG residues.

Example 6

A copolyester having the composition 100T/21CHDM/79NPG was prepared. DMT (77.60 g, 0.4 moles), NPG (52.83 g, 0.51 moles), CHDM (13.25 g, 0.09 moles), and 1.40 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 0.925 dL/g. The polymer had a $2^{nd}$ cycle Tg of 80.30° C. with no crystalline melting point observed, and compositional analysis showed the diol component of the copolyester consisted of 21.4 mole percent CHDM and 78.6 mole percent NPG residues.

Example 7

A copolyester having the composition 100T/15CHDM/85NPG was prepared. DMT (77.60 g, 0.4 moles), NPG (57.62 g, 0.55 moles), CHDM (6.62 g, 0.05 moles), and 1.37 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 0.863 dL/g. The polymer had a $2^{nd}$ cycle Tg of 77.78° C. with no crystalline melting point observed, and compositional analysis showed the diol component of the copolyester consisted of 14.6 mole percent CHDM and 85.4 mole percent NPG residues.

Example 8

A copolyester having the composition 100T/67CHDM/33NPG was manufactured in a batch pilot plant reactor. DMT (10.215 kg, 22.5 pounds), NPG (4.495 kg, 9.9 pounds), CHDM (5.153 kg, 11.35 pounds), and 53.4 g of a solution of titanium isopropoxide in n-butanol were charged into a 68.13 liter (18-gallon) batch reactor with intermeshing spiral agitators and a distillation column. The agitators were operated forward for 50 minutes and then reversed for 10 minutes. The internal temperature was increased to 200° C. and held for 2 hours. The temperature then was increased to 260° C. and held for 30 minutes. At this time, the weight of distillate was recorded and the temperature was increased to 280° C. Upon reaching 280° C. the weight of distillate again was recorded. The agitator was changed to switch directions every 6 minutes, and vacuum was applied at a rate of 13 Torr/minute until full vacuum (0.5 Torr) was reached. The polymerization mixture was mainatained for 25 minutes at 45 rpm, and then maintained for 15 minutes at 10 rpm. The copolyester thus obtained then was immediately extruded and chopped into pellets. The polymer had an inherent viscosity of 0.791 dL/g, and a $2^{nd}$ cycle Tg of 87.48° C. with no crystalline melting point observed. Compositional analysis (by NMR) showed the diol component of the copolyester consisted of 67.4 mole percent CHDM residues and 32.6 mole percent NPG residues. The color values, using the CIE lab color system, were as follows: L*82.28, a*-0.44, b*3.80.

Example 9

A copolyester having the composition 100T/45CHDM/55NPG was produced in a batch pilot plant reactor. DMT (10.669 kg, 23.5 pounds), NPG (6.220 kg, 13.7 pounds), CHDM (3.223 kg, 7.1 pounds), and 53.4 g of a solution of titanium isopropoxide in n-butanol were charged into a 68.13 liter (18-gallon) batch reactor with intermeshing spiral agitators and a distillation column. After charging the raw materials, the manufacturing procedure described in Example 10 was repeated. The resulting polymer had an inherent viscosity of 0.844 dL/g, and a $2^{nd}$ cycle Tg of 84.08° C. with no crystalline melting point observed. Compositional analysis (by NMR) showed the diol component of the copolyester consisted 45.4 mole percent CHDM residues and 54.6 mole percent NPG residues. The color values were as follows: L*83.19, a*-0.27, b*3.97.

Example 10

Example 9 was repeated except that the polycondensation was modified to produce a copolyester having a lower IV. After reaching full vacuum (0.5 Torr), the agitator was held at 25 rpm for only 30 minutes, and then held for 15 minutes at 10 rpm. The copolyester polymer then was immediately extruded and chopped into pellets. The copolyester polymer had an inherent viscosity of 0.713 dL/g, and a $2^{nd}$ cycle Tg of 83.41° C. with no crystalline melting point observed. Compositional analysis (by NMR) showed the diol component of the copolyester consisted of 44.1 mole percent CHDM and 55.9 mole percent NPG. The color values were as follows: L*82.79, a*-0.40, b*3.15.

The resistance of the following amorphous copolyesters to attack or degradation by lipid solutions was evaluated:
Copolyester I: PETG 6763, a commercially-available amorphous polyester wherein the diacid component consists of 100 mole percent terephthalic acid residues and the diol component consisting of about 69 mole percent EG residues and 31 mole percent CHDM residues; IV=0.71.
Copolyester II: PCTG 5445, a commercially-available amorphous polyester wherein the diacid component consists of 100 mole percent terephthalic acid residues and the diol component consisting of about 38 mole percent EG residues and 62 mole percent CHDM residues; IV=0.72.
Copolyester III: Amorphous copolyester of Example 8.
Copolyester IV: Amorphous copolyester of Example 9.

Standard tensile test bars (ASTM-D638) of each of the copolyesters I, II, III, and IV were prepared by injection molding. The bars were placed on three-point-bend strain rigs at fixed strains of 0, 0.5, 1.5 and 2.7% while simultaneously being exposed to Liposyn II 20% intravenous fat emulsion (lipid solution) for 72 hours. Exposure to the lipid solution was accomplished by placing a 2.54 mm×1.77 mm (1 inch×0.5 inch) patch of filter paper over the center of the bar and saturating the patch with the lipid solution initially and then rewetting several times a day. The treated bars were then subjected to tensile testing according to ASTM D638. The results of these tensile tests are shown in Table I wherein the values given for the experimental strain conditions (Condition Strain), Yield Strain, and Elongation at Break are percentages. Yield Stress and Break Stress are given in megapascals. Each test bar was inspected before and after the evaluation and given a rating of A=no change, B=slightly crazed, C=moderately crazed, or D=severely crazed. Similar resistance tests were run with IPA instead of lipid, with these results shown in Table II wherein the values are the same as those for Table I. The control represents samples prior to contact with lipid solution. An inspection of Tables I and II clearly shows that the amorphous copolyester of the present invention exhibit better overall performance than the corresponding commercial amorphous copolyester I and II. The superior performance is manifested, in general, by the maintenance of a satisfactory appearance and the maintenance of high elongation to break after exposure to the lipid while under strain.

TABLE I

| Copolyester | Condition Strain | Yield Strain | Elongation to Break | Yield Stress | Break Stress | Appearance |
|---|---|---|---|---|---|---|
| I | Control | 5.3 | 167 | 48.6 | 29.2 | |
| I | 0 | 5.3 | 65.4 | 51.1 | 25.5 | A |
| I | 0.5 | 5.3 | 63.2 | 50.5 | 25.1 | A |
| I | 1.5 | 5.3 | 40 | 51.5 | 25.2 | D |
| I | 2.7 | 5.2 | 51.3 | 49.8 | 25.9 | B |
| II | Control | 4.7 | 285 | 43.4 | 40.7 | |
| II | 0 | — | — | — | — | — |
| II | 0.5 | 4.9 | 289.5 | 46.7 | 43.8 | A |
| II | 1.5 | 4.9 | 296.0 | 46.8 | 43.3 | A |
| II | 2.7 | — | 6.9 | — | 29.5 | D |
| III | Control | 5.7 | 178.9 | 43.8 | 46.8 | |
| III | 0 | 5.3 | 154.9 | 45.1 | 43.1 | A |
| III | 0.5 | 5.3 | 148.3 | 45 | 41.7 | A |
| III | 1.5 | 5.4 | 137.7 | 45.6 | 40.9 | C |
| III | 2.7 | 5.5 | 140.5 | 44.9 | 42.1 | B |
| IV | Control | 5.3 | 134.1 | 47.4 | 42.9 | |
| IV | 0 | 5 | 102.9 | 48.4 | 36.4 | A |
| IV | 0.5 | 5.1 | 99.6 | 48.8 | 37.9 | A |
| IV | 1.5 | 5.2 | 24.7 | 49 | 36.6 | C |
| IV | 2.7 | 5.2 | 18.1 | 48 | 36.9 | C |

TABLE II

| Copolyester | Condition Strain | Yield Strain | Elongation to Break | Yield Stress | Break Stress | Appearance |
|---|---|---|---|---|---|---|
| I | Control | 5.3 | 167 | 48.6 | 29.2 | |
| I | 0 | 5.3 | 79 | 50.5 | 25.5 | A |
| I | 0.5 | 5.3 | 36.7 | 50.3 | 25.2 | C |
| I | 1.5 | 5.3 | 61.7 | 45.6 | 25.1 | C |
| I | 2.7 | 7 | 26.6 | 41.1 | 25.9 | D |
| II | Control | 4.7 | 285 | 43.4 | 40.7 | |
| II | 0 | — | — | — | — | — |
| II | 0.5 | 5 | 287.7 | 46.3 | 43.5 | D |

TABLE II-continued

| Copolyester | Condition Strain | Yield Strain | Elongation to Break | Yield Stress | Break Stress | Appearance |
|---|---|---|---|---|---|---|
| II | 1.5 | 5.1 | 296.0 | 38.1 | 40.2 | D |
| II | 2.7 | 7.3 | 6.9 | 33.2 | 39.5 | D |
| III | Control | 5.7 | 178.9 | 43.8 | 46.8 | |
| III | 0 | 5.1 | 161 | 45.1 | 44.7 | A |
| III | 0.5 | 5.2 | 159.4 | 44.8 | 43.8 | B |
| III | 1.5 | 5.6 | 125 | 44.7 | 38.9 | C |
| III | 2.7 | 5.7 | 150 | 42.1 | 42.9 | D |
| IV | Control | 5.3 | 134.1 | 47.4 | 42.9 | |
| IV | 0 | 5.1 | 114.9 | 48.1 | 38.1 | A |
| IV | 0.5 | 5.1 | 104.5 | 48.3 | 36.9 | B |
| IV | 1.5 | 4.3 | 4.3 | 42.5 | 42.5 | C |
| IV | 2.7 | 5.2 | 5.2 | 36.4 | 36.4 | D |

Example 11

A copolyester having the composition 100T/64CHDM/36NPG was produced in a batch pilot plant reactor. DMT (10.215 kg, 22.5 pounds), NPG (4.495 kg, 9.9 pounds), CHDM (5.153 kg, 11.35 pounds), and 53.4 grams of a solution of titanium isopropoxide in n-butanol were charged into a 68.13 liter (18-gallon) batch reactor with intermeshing spiral agitators and a distillation column. The agitator was operated forward for 50 minutes and then reversed for 10 minutes. The internal temperature was increased to 200° C. and held for 2 hours. The temperature was then increased to 260° C. and maintained for 30 minutes. After this, the weight of distillate was recorded and the temperature was increased to 280° C. Upon reaching 280° C. the weight of distillate was again recorded. The agitator was changed to switch directions every 6 minutes, and vacuum was applied at 13 Torr/minute until full vacuum (0.5 Torr) was reached and held for 45 minutes at 25 rpm. The copolyester polymer obtained then was immediately extruded, and chopped into pellets. The polymer had an inherent viscosity of 0.678 dL/g. Compositional analysis (by NMR) showed the diol component of the copolyester consisted of 63.9 mole percent CHDM residues and 36.1 mole percent NPG residues. The color values were as follows: L*82.58, a*−0.66, b*4.76.

Example 12

A copolyester having the composition 100T/38CHDM/62NPG was produced in a batch pilot plant reactor. DMT (10.669 kg, 23.5 pounds), NPG (6.220,13.7 pounds), CHDM (3.223, 7.1 pounds), and 53.4 grams of a solution of titanium isopropoxide in n-butanol were charged into a 68.13 liter (18-gallon) batch reactor with intermeshing spiral agitators and a distillation column. The agitator was operated forward for 50 minutes and then reversed for 10 minutes. The internal temperature was increased to 200° C. and maintained for 2 hours. The temperature was then increased to 260° C. and maintained for 30 minutes. After this, the weight of distillate was recorded and the temperature was increased to 280° C. Upon reaching 280° C. the weight of distillate was again recorded. The agitator was changed to switch directions every 6 minutes, and vacuum was applied at 13 Torr/minute until full vacuum (0.5 Torr) was reached and maintained for 45 minutes at 25 rpm. The copolyester polymer obtained then was immediately extruded and chopped into pellets. The polymer had an inherent viscosity of 0.692 dL/g. Compositional analysis (by NMR) showed the diol component of the copolyester contained 38.1 mole percent CHDM residues and 61.9 mole percent NPG residues. The color values were as follows: L*83.04, a*−0.39, b*4.60.

The hydrolytic stability of the following amorphous copolyester polymers was compared:

Polymers I and II: Same as Copolyesters I and II defined above.
Polymer V: Copolyester of Example 11
Polymer IV: Copolyester of Example 12

The procedure used in determining loss in molecular weight as a result of hydrolysis involved placing a sample of the copolyester into the barrel of a capillary rheometer and then heating to either 250° C. or 280° C. and holding for the specified time. The sample was removed, after this treatment, and the molecular weight was determined by standard size exclusion chromatography. The molecular weight loss was calculated from the equation $1 - M_w/M_o$ where $M_w$ is the molecular weight after treatment and $M_o$ is the original molecular weight. The higher the number the greater the weight loss. The values listed in the "hydrolysis" rows are undried samples, while those listed in the "thermal" rows refer to samples dried at 60° C. for 48 hours at a vacuum of approximately 5 Torr. The results are shown in Table III.

TABLE III

| | | | Molecular Weight Loss | | |
|---|---|---|---|---|---|
| | Melt Temp | Melt Time | Polymer I | Polymer II | Polymer V | Polymer VI |
| Hydrolysis | 250 | 5 | 0.24 | 0.1 | 0.05 | 0.05 |
| Hydrolysis | 250 | 7 | 0.32 | 0.15 | 0.05 | 0.02 |
| Hydrolysis | 250 | 10 | 0.43 | 0.22 | 0.07 | 0.01 |
| Hydrolysis | 250 | 15 | 0.57 | 0.28 | 0.11 | 0.05 |
| Thermal | 250 | 5 | 0.02 | 0.02 | 0.08 | 0 |
| Thermal | 250 | 7 | 0.03 | 0.01 | 0.08 | 0.08 |
| Thermal | 250 | 10 | 0.02 | 0.02 | 0.12 | 0.05 |
| Thermal | 250 | 15 | 0.02 | 0.03 | 0.09 | 0.07 |
| Hydrolysis | 280 | 5 | 0.47 | 0.24 | 0.07 | 0 |
| Hydrolysis | 280 | 7 | 0.61 | 0.36 | 0.07 | 0.02 |
| Hydrolysis | 280 | 10 | 0.68 | 0.44 | 0.07 | 0.03 |
| Hydrolysis | 280 | 15 | 0.67 | 0.57 | 0.15 | 0.07 |
| Thermal | 280 | 5 | 0.07 | 0.08 | 0.13 | 0.1 |
| Thermal | 280 | 7 | 0.07 | 0.07 | 0.16 | 0.13 |
| Thermal | 280 | 10 | 0.06 | 0.06 | 0.2 | 0.16 |
| Thermal | 280 | 15 | 0.1 | 0.08 | 0.22 | 0.19 |

Example 13

A copolyester having the composition 100T/49CHDM/51NPG was prepared. DMT (97 g, 0.5 moles), NPG (48.9 g, 0.47 moles), CHDM (40.7 g, 0.28 moles), and 1.26 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 0.49 dL/g. The polymer had a $2^{nd}$ cycle Tg of 82.2° C. with no crystalline melting point observed, and compositional analysis showed the diol component of the copolyester consisted of 49 mole percent CHDM and 51 mole percent NPG residues.

The procedure of Example 13 was repeated eight times to obtain sufficient polymer for molding and evaluation. The NMR composition (mole percent), inherent viscosity (dL/g) and $2^{nd}$ cycle DSC Tg (° C.) of each of the polymers obtained from the repetitions are shown below. The copolyesters obtained from Example 13 and the repetitions thereof were combined and mixed prior to molding.

| Composition | IV | 2nd cycle DSC Tg |
|---|---|---|
| T, 50NPG, 50CHDM | 0.52 | 83.4 |
| T, 50NPG, 50CHDM | 0.51 | 83.2 |
| T, 51NPG, 49CHDM | 0.52 | 83.1 |
| T, 50NPG, 50CHDM | 0.50 | 83.3 |
| T, 50NPG, 50CHDM | 0.51 | 82.8 |
| T, 51NPG, 49CHDM | 0.51 | 82.2 |
| T, 50NPG, 50CHDM | 0.52 | 82.3 |
| T, 50NPG, 50CHDM | 0.52 | 82.5 |

Example 14

A copolyester having the composition 100T/50CHDM/50NPG was prepared. DMT (97 g, 0.5 moles), NPG (48.9 g, 0.47 moles), CHDM (40.7 g, 0.28 moles), and 1.26 ml of a solution containing 15 g of titanium tetraisopropoxide in 250 ml of n-butanol were added to a 500 ml single neck round bottom flask and reacted and polymerized according to the procedure described in Example 1. The inherent viscosity of the polymer was 0.56 dL/g. The polymer had a $2^{nd}$ cycle Tg of 84° C. with no crystalline melting point observed, and compositional analysis showed the diol component of the copolyester consisted of 50 mole percent CHDM and 50 mole percent NPG residues.

The procedure of Example 14 was repeated six times to obtain sufficient polymer for molding and evaluation. The NMR composition (mole percent), inherent viscosity (dL/g) and $2^{nd}$ cycle DSC Tg (° C.) of each of the polymers obtained from the repetitions are shown below. The copolyesters obtained from Example 14 and the repetitions thereof were combined and mixed prior to molding.

| Composition | IV | 2nd cycle DSC Tg |
|---|---|---|
| T, 50NPG, 50CHDM | 0.54 | 83.3 |
| T, 50NPG, 50CHDM | 0.55 | 82.7 |
| T, 50NPG, 50CHDM | 0.54 | 83.9 |
| T, 50NPG, 50CHDM | 0.56 | 83.6 |
| T, 50NPG, 50CHDM | 0.56 | 83.2 |
| T, 49NPG, 51CHDM | 0.54 | 82.8 |

Example 15

A copolyester having the composition 100T/49CHDM/51 NPG was produced in a batch pilot plant reactor. DMT (10.646 kg, 23.5 pounds), NPG (6.214 kg, 13.7 pounds), CHDM (3.234 kg, 7.1 pounds), and 26.7 grams of a solution of titanium isopropoxide in n-butanol were charged into a 68.13 liter (18-gallon) batch reactor with intermeshing spiral agitators and a distillation column. The agitator was operated forward for 50 minutes and then reversed for 10 minutes. The internal temperature was increased to 200° C. and held for 2 hours. The temperature was then increased to 260° C. and maintained for 30 minutes. After this, the weight of distillate was recorded and the temperature was increased to 280° C. Upon reaching 280° C. the weight of distillate was again recorded. The agitator was changed to switch directions every 6 minutes, and vacuum was applied at 13 Torr/minute until full vacuum (0.5 Torr) was reached and held until a 750 wattmeter increase or a peak. The copolyester polymer obtained then was immediately extruded, and chopped into pellets. The polymer had an inherent viscosity of 0.77 dL/g. Compositional analysis (by NMR) showed the diol component of the copolyester consisted of 49.3 mole percent CHDM residues and 50.7 mole percent NPG residues.

Comparative Example 1

A copolyester having the composition 100T/48CHDM/52NPG was prepared. DMT (97.0 g, 0.5 moles), NPG (48.9 g, 0.47 moles), CHDM (40.7 g, 0.28 moles), and 0.63 ml of a solution containing 15 g of titanium tetraisopropoxide in 250 ml of n-butanol were added to a 500 ml single neck round bottom flask. The flask was immersed in a Belmont metal bath that was preheated to 200° C. Immediately after the flask was immersed the temperature was increased to and held at 220° C. for 2.5 hours. The temperature then was increased to and held at 260° C. for 30 minutes. After this time the theoretical methanol was collected. The pressure in the flask was then reduced from atmospheric to 0.5 Torr. When the pressure had been reduced to 0.5 Torr(6 minutes), the temperature set point was then raised to 280° C. Approximately 5 minutes after raising the temperature set point to 280° C., stirring was reduced from 200 rpm to 100 rpm and held for 10 minutes. The vaccum was discontinued and nitrogen was bled into the flask. The polymer was allowed to solidify by cooling to a temperature below Tg, removed from the flask and then ground to pass through a 3 mm screen. The inherent viscosity of the polymer was 0.29 dL/g. The polymer had a $2^{nd}$ cycle DSC Tg of 75.4° C. and compositional analysis by NMR showed the diol component of the copolyester consisted of 48 mole percent CHDM and 52 mole percent NPG residues.

The procedure of Comparative Example 1 was repeated eight times to obtain sufficient polymer for molding and evaluation. The NMR composition (mole percent), inherent viscosity (dL/g) and $2^{nd}$ cycle DSC Tg (° C.) of each of the polymers obtained from the repetitions of Comparative Example 1 are shown below. The copolyesters obtained from Comparative Example 1 and the repetitions thereof were combined and mixed prior to molding.

| Composition | IV | 2nd cycle DSC Tg |
|---|---|---|
| T, 52NPG, 48CHDM | 0.31 | 77.1 |
| T, 52NPG, 48CHDM | 0.31 | 75.6 |
| T, 52NPG, 48CHDM | 0.37 | 79.1 |
| T, 52NPG, 48CHDM | 0.36 | 78.4 |
| T, 52NPG, 48CHDM | 0.29 | 74.0 |
| T, 52NPG, 48CHDM | 0.34 | 78.5 |
| T, 52NPG, 48CHDM | 0.34 | 78.2 |
| T, 52NPG, 48CHDM | 0.33 | 78.1 |

Standard tensile test bars (ASTM-D638) were prepared by injection molding each of the copolyesters Examples 13, 14, 15 and Comparative Example 1 and subjected to tensile testing according to ASTM D638, flexural testing according to ASTM D790 and Unotched Izod Impact Strength at 23° C. according to ASTM D256. The results of these tests are shown in Table IV wherein the values given for Yield Strain and Break Strain are percentages, Yield Stress, Break Stress and Modulus are given in pounds per square inch. The inherent viscosities (IV, dL/g) were measured prior to molding.

TABLE IV

| | Example | | | |
|---|---|---|---|---|
| | 13 | 14 | 15 | C-1 |
| IV | 0.51 | 0.56 | 0.77 | 0.33 |
| Flexural | | | | |
| Yield Strain | 5.01 | 5.1 | 4.8 | 1.96 |
| Yield Stress | 9380 | 9313 | 9495 | 4888 |
| Modulus | 269738 | 265031 | 278381 | 252056 |
| Tensile | | | | |
| Yield Strain | 5.36 | 5.24 | 5.2 | 2.4 |
| Yield Stress | 6493 | 6526 | 6461 | 3534 |
| Break Stress | 4921 | 7518 | 8695 | 3534 |
| Break Strain Elongation to break | 92.98 | 180 | 180.16 | 2.4 |
| Izod | | | | |
| Unnotched | 80% No Break >16 ft-lb/inch | 80% No Break >16 ft-lb/inch | 100% No Break >16 ft-lb/inch | 100% Break 0.51 ft-lb/inch |

The low molecular weight copolyester of Comparative Example 1 (IV=0.33), similar to the copolyester exemplified in U.S. Pat. No. 4,551,403, exhibits an elongation to break of only 2.4% whereas the elongation to break of the Example 13 copolyester (IV=0.51) is 92.98%. These elongation to break values go to 180% for copolyesters having IV's of 0.56 and 0.77. The elongation to break values demonstrate the excellent and useful mechanical properties for the copolyesters having IV's of greater than 0.5 dL/g. In addition, the unnotched Izod impact value for the copolyester of Comparative Example 1 was only 0.51 foot-pounds per inch with 100% of the test bars breaking during the test. This unnotched Izod impact value indicate that the Comparative Example 1 copolyester is a very brittle material and is contrasted to the 80% no break for the copolyesters of Examples 13 and 14 and 100% no break for the copolyester of Example 15. The higher molecular weight copolyesters of Examples 13, 14 and 15 therefore are non-brittle, tough useful materials. The copolyester of Comparative Example 1 was so brittle that it was almost impossible to mold test bars for the mechanical property evaluation. Thus, the low molecular weight copolyester of Comparative Example 1 is of no value as a molding or extrusion copolyester. In contract, the copolyesters having IV's greater than 0.5 dL/g have excellent mechanical properties.

Example 16

A copolyester comprising a diacid component consisting of 100 mole percent terephthalic acid residues and a diol component consisting of 60 mole percent CHDM residues and 40 mole percent NPG residues (hereinafter referenced as 100T/60CHDM/40NPG) was melt-phase polymerized in a 65 gallon (245 liter) stainless steel batch reactor with intermeshing spiral agitators. To the reactor was added 39.64 kg (87.39 pounds, 204.5 moles) of dimethyl terephthalate, 11.48 kg (25.30 pounds, 110.4 moles) of neopentyl glycol (NPG), 28.25 kg (62.27 pounds, 196.3 moles) of 1,4-cyclohexanedimethanol (CHDM) and 112.56 grams of a butanol solution containing the titanium catalyst. The reactor was heated to 200° C. and held for 2 hours with agitation at 25 RPM. The temperature was increased to 260° C. and held for 30 minutes. The temperature was increased to 270° C. and the pressure was reduced at a rate of 13 torr per minute to full vacuum. After the vacuum reached <4000 microns (<4 torr), these conditions were held for 1 hour and 15 minutes at 25 RPM. The RPM was reduced to 15 RPM and the conditions held to a wattmeter peak. The pressure was increased to atmospheric with nitrogen and the copolymer was pelletized.

Bottles were prepared using an 80 mm Bekum H-121 continuous extrusion blow molding machine fitted with a barrier screw. The copolymer had a melt phase inherent viscosity (IV) of 0.719, color values of L*=55.20, a*=0.28, b*=17.76, and a composition by Nuclear Magnetic Resonance (NMR) of 100T/60CHDM40NPG. The materials were dried for 8 hours at 65° C. (150° F.) prior to extrusion. The extruder was run at 21 revolutions per minute (RPM) using a 200° C. (392° F.) barrel temperature and a 190° C. (375° F.) head temperature. The temperature of the melt was 218° C. (425° F.), measured by inserting a melt probe directly into the parison 5 mm out from the die. The materials were extruded into water bottles having a volume of 3.785 liters (1 U.S. gallon), using a 100 mm die. The bottles weighed between 140 and 190 grams.

Example 17

A copolyester comprising a diacid component consisting of 100 mole percent terephthalic acid residues and a diol component consisting of 56 mole percent CHDM residues and 44 mole percent NPG residues (hereinafter referenced as 100T/56CHDM/44NPG) was melt-phase polymerized in a 65 gallon (245 liter) stainless steel batch reactor with intermeshing spiral agitators. To the reactor was added 39.64 kg (87.39 pounds, 204.5 moles) of dimethyl terephthalate, 11.48 kg (25.30 pounds, 110.4 moles) of neopentyl glycol (NPG), 28.25 kg (62.27 pounds, 196.3 moles) of 1,4-cyclohexanedimethanol (CHDM) and 112.56 grams of a butanol solution containing the titanium catalyst. The reactor was heated to 200° C. and held for 2 hours with agitation at 25 RPM. The temperature was increased to 260° C. and held for 30 minutes. The temperature was increased to 270° C. and the pressure was reduced at a rate of 13 torr per minute to full vacuum. After the vacuum reached <4000 microns (<4 torr), these conditions were held for 1 hour and 15 minutes at 25 RPM. The RPM was reduced to 15 RPM and the conditions held to a wattmeter peak. The pressure was increased to atmospheric with nitrogen and the copolymer was pelletized.

Bottles were prepared using an 80 mm Bekum H-121 continuous extrusion blow molding machine fitted with a barrier screw containing a Maddock mixing section. The copolymer had a melt phase inherent viscosity (IV) of 0.725, color values of L*=50.50, a*=−2.46, b*=2.50, and a composition by Nuclear Magnetic Resonance (NMR) of 100T/56CHDM44NPG. The materials were dried for 8 hours at 65° C. (150° F.) prior to extrusion. The extruder was run at 10 revolutions per minute (RPM) using a 190° C. (375° F.) barrel temperature and a 185° C. (365° F.) head temperature. The temperature of the melt was 212° C. (413° F.), measured by inserting a melt probe directly into the parison 5 mm out from the die. The materials were extruded into handleware juice bottles having a volume of 1.89 liters (64 ounces), using a 70 mm die. The bottles weighed between 70 and 80 grams.

The invention has been described in detail with particular reference to preferred embodiments thereof, but it will be understood that variations and modifications can be effected within the spirit and scope of the invention.

We claim:

1. An amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 comprising:
    (1) a diacid component comprising about 90 to 100 mole percent terephthalic acid residues and 0 to about 10 mole percent isophthalic acid residues; and
    (2) a diol component comprising about 10 to about 70 mole percent 1,4-cyclohexanedimethanol residues and about 90 to about 30 mole percent neopentyl glycol residues;
wherein the amorphous copolyesters comprises 100 mole percent diacid component and 100 mole percent diol component.

2. The amorphous copolyester of claim 1 wherein the diacid component (1) consists essentially of about 90 to 100 mole percent terephthalic acid residues and 0 to about 10 mole percent isophthalic acid residues; and the diol component (2) consists essentially of about 10 to about 70 mole percent 1,4-cyclohexanedimethanol residues and about 90 to about 30 mole percent neopentyl glycol residues.

3. The amorphous copolyester of claim 1 wherein the diacid component consists essentially of at least 95 mole percent terephthalic acid residues.

4. The amorphous copolyester of claim 1 wherein the diacid component consists essentially of 100 mole percent terephthalic acid residues.

5. The amorphous copolyester of claim 1 wherein the diol component consists essentially of about 30 to about 70 mole percent 1,4-cyclohexanedimethanol residues and about 70 to about 30 mole percent neopentyl glycol residues.

6. The amorphous copolyester of claim 1 wherein the diol component consists essentially of about 35 to about 60 mole percent 1,4-cyclohexanedimethanol residues and about 40 to about 65 mole percent neopentyl glycol residues.

7. An amorphous copolyester having an inherent viscosity (IV) of about 0.6 to about 1.1 dL/g measured at a temperature of 25° C. at 0.5 g/dL concentration in a solvent mixture of symmetric tetrachloroethane and phenol having a weight ratio of symmetric tetrachloroethane to phenol of 2:3 comprising:
    (1) a diacid component consisting essentially of terephthalic acid residues; and
    (2) a diol component consisting essentially of about 35 to about 60 mole percent 1,4-cyclohexanedimethanol residues and about 40 to about 65 mole percent neopentyl glycol residues;
wherein the amorphous copolyesters comprises 100 mole percent diacid component and 100 mole percent diol component.

8. A shaped article having improved resistance to degradation from exposure to lipids wherein the shaped article is fabricated from an amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 and comprising:
    (1) a diacid component comprising about 90 to 100 mole percent terephthalic acid residues and 0 to about 10 mole percent isophthalic acid residues; and
    (2) a diol component comprising about 10 to about 70 mole percent 1,4-cyclohexanedimethanol residues and about 90 to about 30 mole percent neopentyl glycol residues;
wherein the amorphous copolyesters comprises 100 mole percent diacid component and 100 mole percent diol component.

9. The shaped article of claim 8 wherein the diacid component (1) consists essentially of about 90 to 100 mole percent terephthalic acid residues and 0 to about 10 mole percent isophthalic acid residues; and the diol component (2) consists essentially of about 10 to about 70 mole percent 1,4-cyclohexanedimethanol residues and about 90 to about 30 mole percent neopentyl glycol residues.

10. The shaped article of claim 8 wherein the article is fabricated by extrusion blow molding.

11. The shaped article of claim 8 wherein the diacid component consists essentially of at least 95 mole percent terephthalic acid residues.

12. The shaped article of claim 8 wherein the diacid component consists essentially of 100 mole percent terephthalic acid residues.

13. The shaped article of claim 8 wherein the diol component of the amorphous copolyester consists essentially of about 30 to about 70 mole percent 1,4-cyclohexanedimethanol residues and about 70 to about 30 mole percent neopentyl glycol residues.

14. The shaped article of claim 8 wherein the diol component of the amorphous copolyester consists essentially of about 35 to about 60 mole percent 1,4-cyclohexanedimethanol residues and about 40 to about 65 mole percent neopentyl glycol residues.

15. The shaped article of claim 14 wherein the diacid component consists essentially of at least 95 mole percent terephthalic acid residues.

16. The shaped article of claim 14 wherein the diacid component consists essentially of 100 mole percent terephthalic acid.

17. The shaped article of claim 8 which is transparent medical device.

18. The medical device of claim 17 which is in the shape of a tube.

19. The medical device of claim 17 which is in the shape of a connector.

20. The medical device of claim 17 which is in the shape of a pump housing.

21. A medical article for contacting solutions containing lipids, the article fabricated from an amorphous copolyester having an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 comprising:
    (1) a diacid component comprising about 90 to 100 mole percent terephthalic acid residues and 0 to about 10 mole percent isophthalic acid residues; and
    (2) a diol component comprising about 10 to about 70 mole percent 1,4-cyclohexanedimethanol residues and about 90 to about 30 mole percent neopentyl glycol residues;
wherein the amorphous copolyesters comprises 100 mole percent diacid component and 100 mole percent diol component.

22. The medical article of claim 21 wherein the diacid component (1) consists essentially of about 90 to 100 mole percent terephthalic acid residues and 0 to about 10 mole percent isophthalic acid residues; and the diol component (2)

consists essentially of about 10 to about 70 mole percent 1,4-cyclohexanedimethanol residues and about 90 to about 30 mole percent neopentyl glycol residues.

23. The medical article of claim 21 wherein the diacid component consists essentially of at least 95 mole percent terephthalic acid residues.

24. The medical article of claim 21 wherein the diacid component consists essentially of 100 mole percent terephthalic acid residues.

25. A medical article for contacting solutions containing lipids, the article fabricated from an amorphous copolyester having an inherent viscosity (IV) of about 0.6 to 1.1 dL/g measured at a temperature of 25° C. at 0.5 g/dL concentration in a solvent mixture of symmetric tetrachloroethane and phenol having a weight ratio of symmetric tetrachloroethane to phenol of 2:3 comprising:

(1) a diacid component consisting essentially of terephthalic acid residues; and (2) a diol component consisting essentially of about 30 to about 70 mole percent 1,4-cyclohexanedimethanol residues and about 70 to about 30 mole percent neopentyl glycol residues;

wherein the amorphous copolyesters comprises 100 mole percent diacid component and 100 mole percent diol component.

26. The medical article of claim 25 wherein the article is a tube, connector or pump housing.

27. A method of melt processing an amorphous copolyester having a moisture content prior to melt processing of 0.02 weight % or more comprising:

(a) prior to melt processing, performing a minimal drying or no drying of the copolyester such that the copolyester has a moisture content of 0.02 weight % or more prior to melt processing, and (b) melt processing the copolyester, wherein the copolyester has an inherent viscosity (IV) of at least about 0.5 dL/g measured at a temperature of 25° C. at 0.5 g/dL concentration in a solvent mixture of symmetric tetrachloroethane and phenol having a weight ratio of symmetric tetrachloroethane to phenol of 2:3 and consists essentially of an acid component of residues of at least 90 mole percent terephthalic acid and a diol component consisting essentially of about 30 to about 70 mole percent 1,4-cyclohexanedimethanol residues and about 70 to about 30 mole percent neopentyl glycol residues, based on 100 mole percent acid component and 100 mole percent glycol component.

28. The method of claim 27 wherein the diol component consists essentially of about 30 to less than 70 mole percent 1,4-cyclohexanedimethanol residues and about 70 to about 30 mole percent neopentyl glycol residues.

29. The method of claim 27 wherein the acid component has residues of at least 95 mole percent terephthalic acid.

30. The method of claim 27 wherein the acid component has residues of 100 mole percent terephthalic acid.

31. The method of claim 27 wherein prior to melt processing, the minimal drying is performed, wherein the minimal drying is by conventional methods for less than 2 hours at 60 to 100° C.

32. The method of claim 27 wherein prior to melt processing, the minimal drying is performed, wherein the minimal drying uses a desiccant bed with forced dehumidified air at 60° C. to 100° C.

33. The method of claim 27 wherein no drying of the copolyester is performed prior to melt processing.

34. A profile produced by profile extrusion comprising the amorphous copolyester of claim 2.

35. An injection molded article comprising the amorphous copolyester of claim 2.

* * * * *